US009509572B2

(12) United States Patent
Li et al.

(10) Patent No.: US 9,509,572 B2
(45) Date of Patent: Nov. 29, 2016

(54) PRESENCE DELAY AND STATE COMPUTATION FOR COMPOSITE SERVICES

(71) Applicant: Futurewei Technologies, Inc., Plano, TX (US)

(72) Inventors: Li Li, Bridgewater, NJ (US); Zhe Wang, Piscataway, NJ (US); Tao Cai, Shenzhen (CN)

(73) Assignee: FutureWei Technologies, Inc., Plano, TX (US)

( * ) Notice: Subject to any disclaimer, the term of this patent is extended or adjusted under 35 U.S.C. 154(b) by 334 days.

(21) Appl. No.: 14/317,050

(22) Filed: Jun. 27, 2014

(65) Prior Publication Data

US 2015/0006720 A1    Jan. 1, 2015

Related U.S. Application Data

(60) Provisional application No. 61/840,673, filed on Jun. 28, 2013.

(51) Int. Cl.
*H04L 12/24*   (2006.01)
*H04L 29/08*   (2006.01)

(52) U.S. Cl.
CPC ........... *H04L 41/5009* (2013.01); *H04L 67/16* (2013.01); *H04L 67/24* (2013.01)

(58) Field of Classification Search
CPC . H04L 12/5812; H04L 51/043; H04L 67/24; H04L 67/16; H04L 29/09684
USPC ............. 709/224, 201, 227, 229; 707/999.01
See application file for complete search history.

(56) References Cited

U.S. PATENT DOCUMENTS 7,219,153 B1 * 5/2007 Day ................. H04L 29/06027
707/999.01
7,945,612 B2    5/2011 Raghav et al.
(Continued)

FOREIGN PATENT DOCUMENTS

EP          2306384 A1    4/2011
WO     2012084008 A1    6/2012

OTHER PUBLICATIONS

Li Li, et al., "Compose Presence for Composite Web Services by Timed and-or Tree," Proceedings of International Conference on Information Integration and Web-Based Applications & Services, II WAS '13, Dec. 2013, 5 pages.
(Continued)

*Primary Examiner* — Alina N Boutah
(74) *Attorney, Agent, or Firm* — Conley Rose, P.C.

(57) ABSTRACT

A presence calculation method comprising receiving first presence subscription request for a composite service that comprises a service at the node and a plurality of discrete services at one or more child nodes, sending a second presence subscription request to one or more child nodes in response to the first subscription request, receiving one or more response messages that comprise a collection of presence state transition delays corresponding to the child nodes from the child nodes in response to the second subscription request, determining one or more communication delays between the node and the child nodes using the response messages, computing a presence state transition delay for the composite service using the collection of presence state transition delays and the communication delays; and determining a composite presence state using a mapping between the presence state transition delay for the composite service and the composite presence state.

19 Claims, 8 Drawing Sheets

(56) References Cited

U.S. PATENT DOCUMENTS

| | | | |
|---|---|---|---|
| 8,060,121 B1* | 11/2011 | Sun | H04W 4/00 370/310.2 |
| 8,301,755 B2* | 10/2012 | De Peuter | G06Q 10/10 709/223 |
| 2002/0024947 A1* | 2/2002 | Luzzatti | H04L 12/6418 370/352 |
| 2004/0139194 A1* | 7/2004 | Naganathan | H04L 41/046 709/224 |
| 2007/0060355 A1* | 3/2007 | Amaitis | G06Q 20/3224 463/40 |
| 2007/0276937 A1 | 11/2007 | Chavda et al. | |
| 2008/0222235 A1* | 9/2008 | Hurst | H04N 7/17336 709/201 |
| 2010/0195557 A1* | 8/2010 | Aoki | H04L 12/4035 370/312 |
| 2011/0071972 A1* | 3/2011 | Zmolek | G06Q 10/10 706/47 |
| 2012/0192075 A1* | 7/2012 | Ebtekar | H04L 12/6418 715/738 |
| 2015/0195189 A1* | 7/2015 | Winzer | H04L 45/20 709/241 |
| 2016/0071303 A1* | 3/2016 | Furtwangler | G06F 9/4443 715/762 |

OTHER PUBLICATIONS

Li, et al., "Mirror Presence Between Websites," U.S. Appl. No. 13/962,733, filed Aug. 8, 2013, Specification 22 pages, Drawings 6 pages.

Li, et al., "Mechanisms to Compose, Execute, Save, and Retrieve Hyperlink Pipelines in Web Browsers," U.S. Appl. No. 13/793,066, filed Mar. 11, 2013, Specification 26 pages, Drawings 7 pages.

Bertoli, P., et al., "Automated composition of Web services via planning in asynchronous domains," Artificial Intelligence 174, Mar. 1, 2010, pp. 316-361.

Jun, N., et al., "Improved Adaptation of Web Service Composition Based on Change Impact Probability," 2010 Third International Conference on Dependability, IEEE Computer Society, Jul. 18, 2010, pp. 146-153.

Foreign Communication From a Counterpart Application, PCT Application No. PCT/US2014/044508, International Search Report dated Oct. 29, 2014, 5 pages.

Foreign Communication From a Counterpart Application, PCT Application No. PCT/US2014/044508, Written Opinion dated Oct. 29, 2014, 10 pages.

\* cited by examiner

PRESENCE DELAY AND STATE COMPUTATION FOR COMPOSITE SERVICES

CROSS-REFERENCE TO RELATED APPLICATIONS

The present application claims benefit of U.S. Provisional Patent Application No. 61/840,673 filed Jun. 28, 2013 by Li Li, et al. and entitled "Presence Delay and State Computation for Composite Services Based On Timed AND-OR Tree," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Service compositions may be processes which combine atomic services into a new service. A service composition may form the basis for a Service-Oriented Architecture (SOA) to reuse machines and resources over networked computers. In SOA, each service may provide a defined set of functions and/or well-defined interfaces in terms of protocols and functionalities. Each service may be accessible over a network and collectively may provide a complete functionality of a larger software application. Many service composition languages and systems have been proposed for SOA, such as Web Services Business Process Execution Language (WS-BPEL), WS-BPEL Extension For People (BPEL4People), Web Service Choreography (WS-Choreography), Business Process Execution Language for Representational State Transfer (BPEL for REST), Yahoo Pipes, and Hyperlink Pipeline.

Determining accurate estimates of presence states and presence delays in each of the services that compose the final application such that the services may cooperate and perform as a service composition may be challenging in real time communication systems with SOA. In a SOA system, the presence state of each atomic service may be discrete and may not be merged or compared for composite services. Atomic services may employ different presence systems and/or may follow different presence standards. Presence states may also be defined differently from one system to another system. For instance, two presence systems may use the same state for different meanings or different states for the same meaning. Efficiently determining presence information for composite services as a whole entity and/or providing accurate timing information about service availability may allow the use of composite services for real time applications.

SUMMARY

In one embodiment, a presence calculation method comprising receiving a first presence subscription request for a composite service that comprises a service at the node and a plurality of discrete services at one or more child nodes, sending a second presence subscription request to the one or more child nodes in response to the first subscription request, receiving one or more response messages that comprise a collection of presence state transition delays corresponding to the child nodes from the child nodes in response to the second subscription request, determining one or more communication delays between the node and the child nodes using the response messages, computing a presence state transition delay for the composite service using the collection of presence state transition delays and the communication delays; and determining a composite presence state using a mapping between the presence state transition delay for the composite service and the composite presence state, wherein the presence state transition delay for the composite service indicates an amount of time for the node to transition to an available presence state from another presence state.

In another embodiment, an apparatus comprising executable instructions stored on a non-transitory computer readable medium that when executed by a processor causes a network device to receive a subscription request for a composite service that comprises one or more discrete services, send a subscription request to one or more child nodes in response to receiving the subscription request, receive one or more subscription response messages from the child nodes that comprise a collection of presence state transition delays of the child nodes, compute a presence state transition delay based on the collection of presence transition delays of the child nodes and a communication delay for the subscription response message, and send a second subscription response message that comprises the presence state transition delay of the processor, wherein the presence state transition delay of the processor indicates an amount of time for the processor to transition to an available presence state from another presence state.

In yet another embodiment, an apparatus comprising a receiver configured to receive a presence event message from a sub-tree, wherein the presence event message comprises a presence state transition delay for the sub-tree, a processor coupled to a memory device and the receiver, wherein the memory comprises computer executable instructions stored in a non-transitory computer readable medium such that when executed by the processor causes the processor to compute a presence state transition delay for the apparatus using the presence state transition delay for the sub-tree, and a transmitter coupled to the processor, wherein the transmitter is configured to send a presence event message that comprises the presence state transition delay for the apparatus to a parent node.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are a various embodiments for computing the presence delay and/or presence state for composite services using a TAO tree. In one embodiment, a presence subscription overlay may be implemented on a service composition process to reduce complex service composition to one or more TAO tree representations of presentities and/or services. The presence states of discrete services in a service composition may be mapped to expected presence state transition delays in a continuous time domain and the expected presence state transition delays may be used to compute the expected presence state transition delay of the entire tree in the time domain. The presence state of the entire tree may also be determined from the presence states of the discrete services in the service composition. A TAO tree may increase the usability of composite services.

A composite service may comprise a plurality of atomic or discrete services and may be configured to employ the plurality of discrete services, which may not always be available and/or may have a plurality of presence states. The terms "atomic service" and "discrete service" may be used interchangeably to refer to a service that may operate independently of other services. A discrete service may refer to a service that may be employed in a service composition, but whose own composition may not be accessible to the composition process. As such, a discrete service may be an independent service. Providing presence state transition delays and/or presence states to a client may reduce uncertainty when using composite services. Composite services may be configured to implement conventional rules for discrete services without substantial changes. Presence states from different presence systems may be integrated in the time domain without manual translations of each presence state. The disclosed embodiments may be configured to transmit a presence state transition delay using conventional presence subscriptions and/or presence notification messages with minor extensions and may inform clients when a composite service may become available. For instance, one or more embodiments may be implemented through extensions to current Session Initiation Protocol (SIP), Extensible Messaging and Presence Protocol (XMPP), and/or other presence protocols. As such, a TAO tree may be implemented with a composite service to reduce network traffic.

Figure 1:
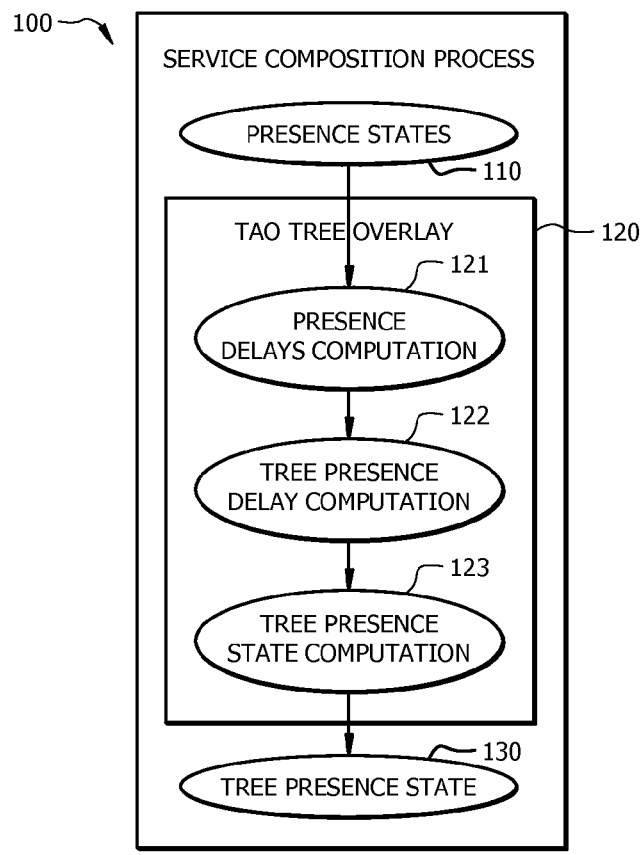
FIG. 1 is a schematic diagram of an embodiment of a service composition process.

FIG. 1 is a schematic diagram of service composition process 100 employing a TAO tree overlay 120. The service composition process 100 may be configured to convert one or more discrete service presence states 110 to one or more tree presence states 130 using the TAO tree overlay 120. A presence state may indicate an ability and/or willingness of a resource to communicate with other resources. A resource may comprise a network machine, a computer, a client, a server, a web browser, a web site, a hunt group, a tablet, a mobile device, a cell phone, or any other suitable network resource for running one or more discrete service processes as would be appreciated by one of ordinary skill in the art upon viewing this disclosure. Presence states may include, but are not limited to, a busy state, a meeting state, an away state, an idle state, an inactive state, an active state, and an available state. A tree presence state may be derived from a combination of a plurality of presence states for a plurality of discrete services. The tree presence state may be a composite presence state for a composition service. A composite service may be a service that comprises a plurality of discrete services.

A TAO tree overlay 120 may be implemented on one or more servers (e.g., a computer server) and/or on a client (e.g., a web browser). In one embodiment, a TAO tree overlay 120 may be implemented substantially on either a server or a client. Alternatively, at least portions of a TAO tree overlay 120 may be implemented in servers and at least a portion of the TAO tree overlay 120 may be implemented in a client. The TAO tree overlay 120 may be overlaid on top of or incorporated within the service composition process 100. The TAO tree overlay 120 may be configured to map one or more discrete presence states to temporal presence state transition delays and to output a composite presence state based on the discrete presence states and/or the temporal presence state transition delays. The TAO tree overlay 120 may be configured to receive and/or to extract presence information (e.g., presence states and/or presence state transition delays) from one or more of the discrete services in the service composition process 100.

The TAO tree overlay 120 may be configured to compute presence state transition delays 121 for one or more discrete services based on their presence states 110, to compute a tree presence state transition delay 122 based on the presence state transition delays 121 of the discrete services, to compute a tree presence state 123 based on the tree presence state transition delay 122, and to present the tree presence state 130 for the service composition process 100. A presence state transition delay 121 may indicate an amount of time for a discrete service to transition from a first state (e.g., a busy state) to a second state (e.g., a ready state) where the discrete service may be configured to communicate with other services. Computing a presence state transition delay 121 may comprise converting a presence state for a discrete service to a unit of time or time delay. In one embodiment, each discrete service may be responsible for converting its presence state to a presence state transition delay. The discrete service may implement one or more atomic processes to convert its presence state to a presence state transition delay. A tree presence state transition delay 122 may indicate an amount of time for the aggregation of discrete services to transition to from a first state to a second state. Computing a tree presence state transition delay 122 may comprise computing the time or time delay using the presence delays of a plurality of discrete services. A tree presence state may indicate a composite presence state for a composite service. Computing a tree presence state 123 may comprise converting a tree presence state transition delay 122 to a presence state for a composite service.

Figure 2:
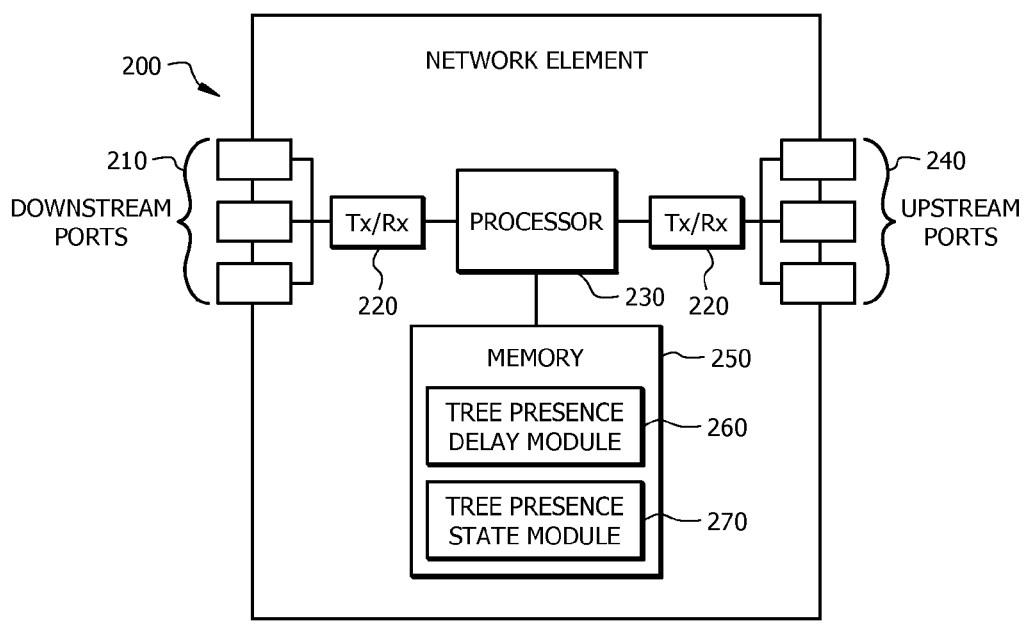
FIG. 2 is a schematic diagram of an embodiment of a network element.

FIG. 2 is a schematic diagram of an embodiment of a network element 200 that may be used to implement a service composition process 100 and/or a TAO tree overlay 120 shown in FIG. 1. At least some of the features/methods described in the disclosure may be implemented in the network element 200. For instance, the features/methods of the disclosure may be implemented in hardware, firmware, and/or software installed to run on the hardware. The network element 200 may be any device (e.g., a switch, router, bridge, server, client, etc.) that transports data through a network, system, and/or domain. Moreover, the terms network "element," network "node," network "component," network "module," and/or similar terms may be interchangeably used to generally describe a network device and do not have a particular or special meaning unless otherwise specifically stated and/or claimed within the disclosure. In one example embodiment, the network element 200 may be an apparatus (e.g., a network machine) configured to implement one or more service processes.

The network element 200 may comprise one or more downstream ports 210 coupled to a transceiver (Tx/Rx) 220, which may be transmitters, receivers, or combinations thereof. The Tx/Rx 220 may transmit and/or receive frames from other network nodes via the downstream ports 210. Similarly, the network element 200 may comprise another Tx/Rx 220 coupled to a plurality of upstream ports 240, wherein the Tx/Rx 220 may transmit and/or receive frames from other nodes via the upstream ports 240. The downstream ports 210 and/or the upstream ports 240 may include electrical and/or optical transmitting and/or receiving components. In another example embodiment, the network element 200 may comprise one or more antennas coupled to the Tx/Rx 220. The Tx/Rx 220 may transmit and/or receive data (e.g., packets) from other network elements wirelessly via one or more antennas.

A processor 230 may be coupled to the Tx/Rx 220 and may be configured to process the frames and/or determine which nodes to send (e.g., transmit) the packets. In an example embodiment, the processor 230 may comprise one or more multi-core processors and/or memory modules 250, which may function as data stores, buffers, etc. The processor 230 may be implemented as a general processor or may be part of one or more application specific integrated circuits (ASICs), field-programmable gate arrays (FPGAs), and/or digital signal processors (DSPs). Although illustrated as a single processor, the processor 230 is not so limited and may comprise multiple processors. The processor 230 may be configured to subscribe to a presence for one or more discrete and/or composite services, to send and/or receive presence event messages, and/or to calculate a composite presence state transition delay and/or a composite presence state.

FIG. 2 illustrates that a memory module 250 may be coupled to the processor 230 and may be a non-transitory medium configured to store various types of data. Memory module 250 may comprise memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 250 may be used to house the instructions for carrying out the various embodiments described herein. In one embodiment, the memory module 250 may comprise a tree presence delay module 260 and/or a tree presence state module 270 that may be implemented on the processor 230. In one embodiment, the tree presence delay module 260 and/or the tree presence state module 270 may be implemented on a network client and/or server to generate one or more composite presence states using a plurality of discrete presence states and/or present state transition delays. The tree presence delay module 260 may be configured to implement a TAO tree presence subscription and to compute a service presence state transition delay and/or a tree presence state transition delay. The tree presence state module 270 may be configured to convert a tree presence state transition delay to a tree presence state, to implement a TAO tree presence state table, and/or to assign one or more tree presence states. The tree presence delay module 260 and/or the tree presence state module 270 may be configured to implement methods 600 described in FIG. 6 and/or method 700 described in FIG. 7.

It is understood that by programming and/or loading executable instructions onto the network element 200, at least one of the processor 230, the cache, and the long-term storage are changed, transforming the network element 200 in part into a particular machine or apparatus, for example, a multi-core forwarding architecture having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Figure 3:
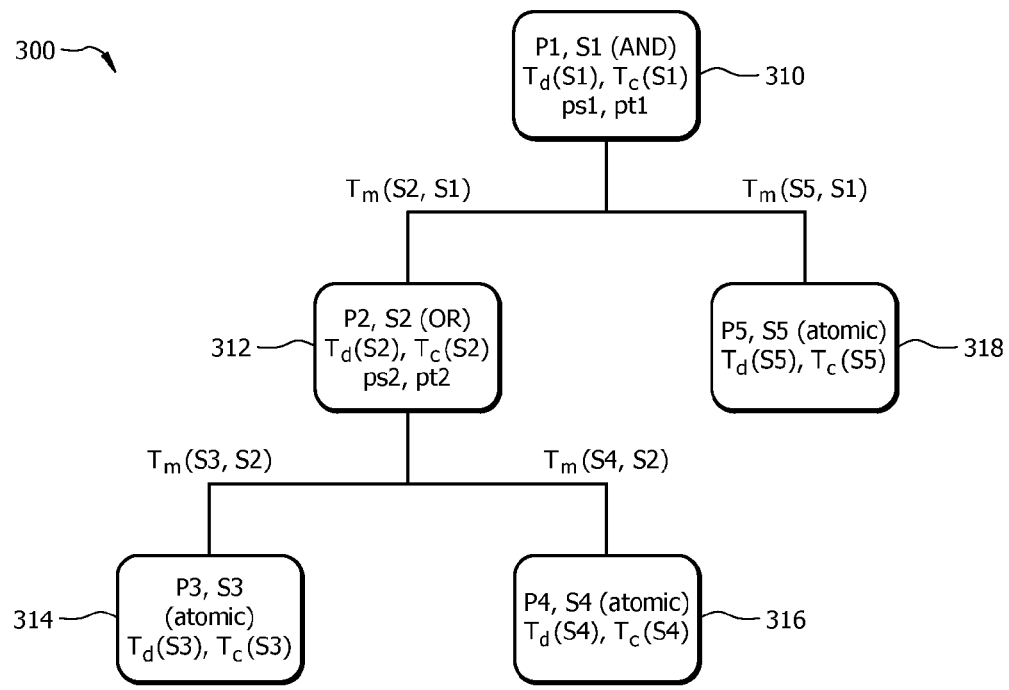
FIG. 3 is a schematic diagram of an embodiment of a Timed AND-OR (TAO) tree system.

FIG. 3 is a schematic diagram of an embodiment of a TAO tree system 300. The TAO tree system 300 may be configured to map one or more discrete services in a composite service into a tree structure based on the dependencies of the discrete services. The TAO tree system 300 comprises five nodes 310-318. A parent node may be a service that depends on the services of one or more child nodes. One or more child nodes that a parent node depends on may also be referred to as a sub-tree of the parent node. A parent node may also be referred to as a root node. Node 310 may be configured as a parent node for nodes 312 and 318. Nodes 312 and 318 may be referred to as child nodes for node 310. Node 312 may also be configured as a parent node for nodes 314 and 316. A node 310-318 may comprise a network machine, a computer, a client, a server, a web browser, a web site, a hunt group, a tablet, a mobile device, a cell phone, or any other suitable network resource for running one or more discrete service processes as would be appreciated by one of ordinary skill in the art upon viewing this disclosure.

Nodes 310-318 may be coupled to one another using a plurality of edges. An edge may represent communication paths between the nodes 310-318. Each edge may be associated with a communication delay denoted as Tm. A communication delay may indicate a duration of time for a message to be sent from a first node to a second node using a communication path. The communication delay may be greater than or equal to about zero and may include delays, such as, propagation delays, network delays, queuing delays, and processing delays. In one embodiment, a communication delay may be determined using message time stamps to estimate network delays. Alternatively, a communication delay may be determined and/or computed using any other suitable method as would be appreciated by one of ordinary skill in the art upon viewing this disclosure.

Each node 310-318 may be associated with a node type, one or more discrete services denoted as Si, and a presentity denoted as Pi. A node type may be an AND node, an OR node, or an atomic node. An AND node may be configured to become present (e.g., in an available state) when a discrete service associated with the node is present and the child nodes for the discrete service sub-tree are present. An OR node may be configured to become present when a discrete service associated with the node becomes present and at least one of the child nodes for the discrete service sub-tree is present. An atomic node may be a leaf node and may not have any child nodes. An atomic node may be configured such that a discrete service associated with a node may be configured to change the presence state of the node independent of other nodes. A discrete service may be a service process running on one or more of the nodes 310-318. In FIG. 3, node 310 may be configured as an AND node, node 312 may be configured as an OR node, and nodes 314-318 may be configured as atomic nodes.

In one embodiment, a TAO tree system 300 may use an AND node to represent sequential services and/or sequential (SEQ) nodes when a proportional decrease condition is present. In a proportional decrease condition, for every presence state, a sub-tree presence state transition delay function may decrease monotonically in proportion to time such that:

$$\frac{T_c(S_i, t+\delta) - T_c(S_i, t)}{\delta} \leq -1 \text{ for } \delta > 0,$$

where $T_c(S_i, t)$ is the presence state transition delay of sub-tree Si at time t, and $T_c(S_i, t+\delta)$ is the presence state transition delay of the same sub-tree at a later time $t+\delta$. As such, later predictions at a presence state may be bound by earlier predictions at the same presence state. For example, sequential services $S_1$, $S_2$, and $S_3$ may be present. Invoking a sequential service may comprise iteratively invoking and waiting for each service in turn. Sequential service $S_1$ may be invoked at time $t_1=t$ and may wait for $T_c(S_1, t_1)$, which is about equal to 10 seconds. Sequential service $S_2$ may be invoked at time $t_2=t+T_c(S_1, t_1)=t+10$ and may wait for $T_c(S_2, t_2)$, which is about equal to 10 seconds. Sequential service $S_3$ may be invoked at time $t_3=t+T_c(S_1, t_1)+T_c(S_2, t_2)=t+20$ and may wait for $T_c(S_3, t_3)$, which is about equal to $-5$ seconds. The presence state transition delay for the sub-tree may be about 20 seconds, when individual presence state transition delays are about 10 seconds, 20 seconds, and 15 seconds.

By representing the sequential services as AND nodes and invoking the AND nodes in parallel at a time t, the presence state transition delays for a sub-tree when each sequential service maintains its presence state within an interval $[t, t+\delta]$ may be as follows. The presence state delay for node $S_1$ may be about $T_c(S_1, t)=10$ seconds. The presence state delay for node $S_2$ may be about $T_c(S_2, t) \geq T_c(S_2, t+10)+10=10+10=20$ seconds. The presence state delay for node $S_3$ may be about $T_c(S_3, t) \geq T_c(S_3, t+20)+20=-5+20=15$ seconds. A maximum presence state transition delay may be $\max[T_c(S_1, t), T_c(S_2, t), T_c(S_3, t)] > \max[10, 20, 15]=20$ seconds. As such, the presence state transition delay for the sub-tree may be greater than or about equal to 20 seconds. The presence state transition delay of an AND node may an upper bound of the presence state transition delay for an SEQ node.

When a sequence of discrete services starts at time t, a discrete service $S_i$ invoked at a time $t+\delta$ may take the longest time to start among the discrete services in the sequence. A maximum presence state transition delay among the discrete service may be $t+\delta+T_c(S_i, t+\delta)$. Invoking the discrete service $S_i$ at time t may still result in the longest time to start among the discrete services in the sequence because of the proportional decrease condition $t+T_c(S_i,t) \geq t+\delta+T_c(S_i, t+\delta)$. When a discrete service changes during an interval $[t, t+\delta]$, the upper bound relationship may not hold. Reevaluating the presence state transition delay at the new states may restore the upper bound relationship.

A presentity may be configured to manage and/or store the presence state of one or more discrete services and to compute the presence state of a sub-tree. For instance, a presence subscription may be made to a presentity to obtain presence information for one or more discrete services associated with a node. A presentity may be configured to maintain a presence state of one or more of the discrete services denoted as psi, a presence state transition delay denoted as $Td(Si, t)$, the communication delay Tm, a presence state transition delay for a sub-tree denoted as Tc, and/or a presence state of the sub-tree denoted as pti. A presence state of a discrete service may be provided to the presentity by a discrete service. The presence state transition delay may indicate a duration of time for a discrete service to transition from its current presence state to an available state. The presence state transition delay may be a function of time and/or a presence state and may be configured to be queried at any time by a presentity and/or a TAO tree system 300. For example, for a busy state at a time t, the presence state transition delay may be $Td(S_1,t)=30$ minutes. For a busy state at time t+10, the presence state transition delay may be $Td(S_1, t+10)=-5$ minutes. A negative presence state transition delay may indicate the discrete service reached an available state 5 minutes ago. In another example, if the presence state changes from a busy state to an away state between t and t+10, then at time t+10 the presence state transition delay may be $Td(S_1, t+10)=60$ minutes. A presence state transition delay may be determined using a Timed Markov Model of presence states, based on a distance and/or a speed relative to a base station, based on activity schedules, or any other suitable method as would be appreciated by one of ordinary skill in the art upon viewing this disclosure. A presence state transition delay for a sub-tree may be a function of one or more discrete services and time. The presence state transition delay for a sub-tree may indicate the duration of time for a sub-tree associated with a discrete service to transition to a ready state. A presence state of a sub-tree may indicate the presence state of a sub-tree associated with a parent node and/or a discrete service. The presence state transition delay and/or the presence state of a sub-tree may be computed by the presentity.

Table 1 is an embodiment of a presence state table for a sub-tree. A presence state table include, but is not limited to, a look-up table, a timed Markov Model, or any other suitable structure that may describe a relationship between a presence state transition delay and a presence state as would be appreciated by one of ordinary skill in the art upon viewing this disclosure. A presentity may maintain the presence state of one or more discrete services, one or more nodes, and/or one or more sub-trees using a presence state table. A presence state table may be used as a look-up table and/or a reverse look-up table. The presence state table may map a presence state to a time delay and a time delay to a presence state. In Table 1, the rows may represent the current presence state and the columns may represent available presence states. Available presence states may comprise one or more presence states that are available to transition to from the current state. For instance, the available presence states may include, but is not limited to, an open state, a ready state, and an online state. Each cell may represent a presence state transition delay or the amount of time $t(s_i,s_j)$ to transition from the current presence state $s_i$ to the available presence state $s_j$. The amount of time to transition from the current presence state to the available present state may be represented in any suitable units of time (e.g., seconds) as would be appreciated by one of ordinary skill in the art upon viewing this disclosure. For example, if the current presence state of a sub-tree is $s_1$, the sub-tree may transition to a presence state $s_2$ in a time duration of about $t_{1,2}$.

A presentity may assign a presence state to a TAO tree and/or a sub-tree, which may be used to apply a presence related rule, update a user with the presence state information, and/or invoke a discrete service when the sub-tree become available. The presentity may select a presence state $s_k$ such that the presence state transition delay $|Tc(S_i,t_i)-t(s_k,s_j)|$ of a sub-tree is relatively minimal with respect to the row states in the state table. In one embodiment, the presentity may assign a presence state with a transition delay that is closest to the presence state transition delay of the sub-tree Si at time $t_i$. For example, a presentity may assign a presence state to a sub-tree with a presence state transition delay of about 8 minutes. A transition delay from $S_3$ to reach $S_1$ may be about 10 minutes and a transition delay from $S_4$ to reach state $S_2$ may be about 20 minutes. The presentity may choose to represent the sub-tree with the presence state $S_3$ since the transition delay of about 10 minutes for this presence state is closest to 8 minutes. In the event of a tie, a presentity may be configured to implement any suitable heuristic to select a presence state, for example, a random selection. A presentity may also employ a presence state table to determine a presence state using a time delay. When node transitions to a new presence state, the new presence state may be determined using the time delay to transition from the previous presence state to the new presence state. For instance, if the previous presence state is $S_3$ and the time delay to transition to the new presence state was about $t_{3,2}$, then the new presence state may be determined to be presence state $S_2$.

TABLE 1

An embodiment of a presence state table

| States | $S_1$ | $S_2$ |
|---|---|---|
| $S_1$ | 0 | $t_{1,2}$ |
| $S_2$ | $t_{2,1}$ | 0 |
| $S_3$ | $t_{3,1}$ | $t_{3,2}$ |
| $S_4$ | $t_{4,1}$ | $t_{4,2}$ |

Figure 4:
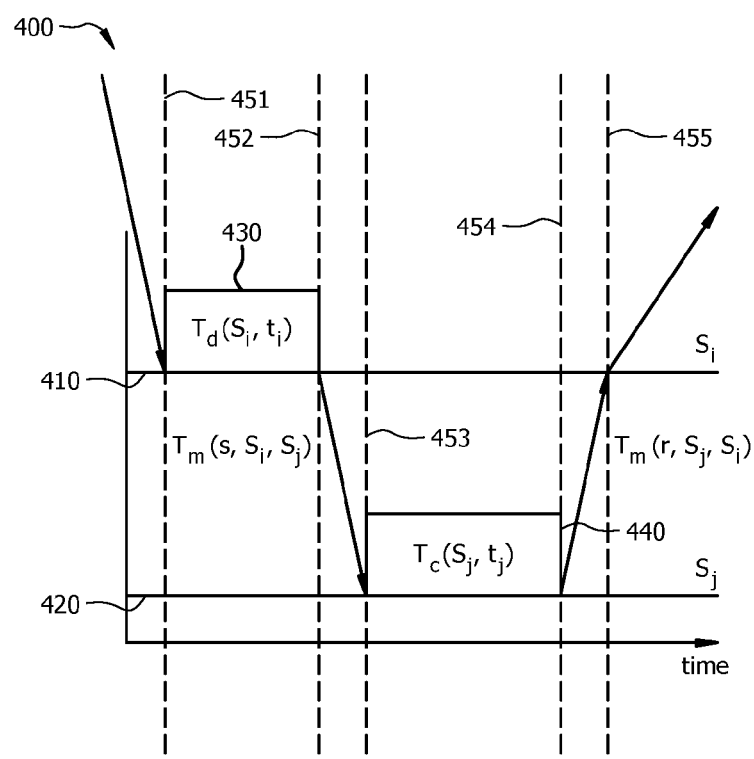
FIG. 4 is a graph of an embodiment of presence state transition delay timing for a service invocation mode.

FIG. 4 is a graph 400 of an embodiment of presence state transition delay timing for a service invocation mode with respect to time. A service invocation mode may be employed by a parent node to implement a discrete service. In a service invocation mode, a discrete service may not perform any tasks until it becomes available. An exchange of service invocation messages may invoke a discrete service. The exchanging of service invocation messages may incur delays from the presence state transition delays of the discrete service. A presence state transition delay may include, but is not limited to, one or more other presence state transition delays, one or more communication delays, and presence state transition delays for one or more sub-tree. The x-axis may represent time and the y-axis may represent nodes and/or services in a TAO tree. Graph 400 comprises a timeline 410 for a parent node Si running a discrete service and a timeline 420 for a child or sub-tree Sj of the discrete service. The parent node Si may further invoke one or more additional child nodes and/or sub-trees with a corresponding timeline.

The discrete service may be requested to start by the parent node at a time 451. The execution of the discrete service may not begin until the discrete service and its sub-tree Sj are in a ready state. The discrete service may have a presence state transition delay 430 of about $Td(Si, t_i)$ for the discrete service to transition to a ready state. At time 452, the discrete service may be in a ready state and may be configured to send a service request message s to sub-tree Sj. The service request message s may have a communication delay of about Tm(s, Si, Sj) amount of time to reach the sub-tree Sj. Sub-tree Sj may receive the service request message s at time 453. At time 453, the sub-tree Sj may have a presence state transition delay 430 of about Tc(Sj, tj) and may become ready at time 454. At time 454, the sub-tree Sj may send a service response message r to the parent node Si that indicates the sub-tree Sj is in a ready state. The service response message r may have a communication delay of about Tm(r, Sj, Si) amount of time to reach the parent node running the discrete service Si from the sub-tree Sj. At time 455, parent node Si may receive the service response message r and the discrete service may start.

Figure 5:
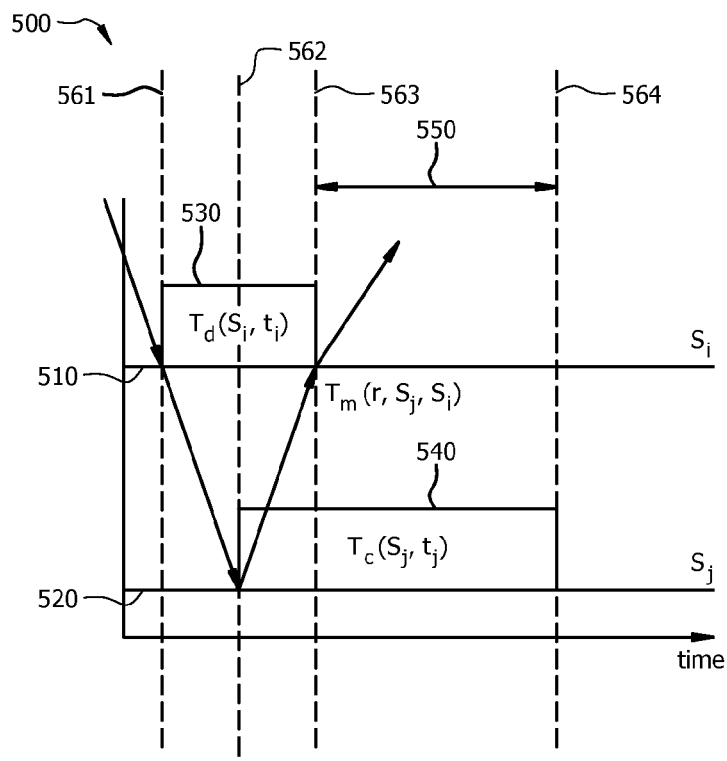
FIG. 5 is a graph of an embodiment of presence state transition delay timing for a presence composition mode.

FIG. 5 is a graph 500 of an embodiment of presence state transition delay timing for a presence composition mode. A presence composition mode may be employed by a parent node to compute presence state transition delays associated with invoking a discrete service. In a presence composition mode, a presentity may be able to accept presence subscription request messages and/or to compute expected presence state transition delays at any time. The presentity may be configured to estimate the presence state transition delay without invoking a discrete service. The x-axis may represent time and the y-axis may represent nodes and/or services in a TAO tree. Graph 500 comprises a timeline 510 for a parent node Si running a discrete service and a timeline 520 for a child or sub-tree Sj of the discrete service. The parent node Si may further invoke one or more additional child nodes and/or sub-trees with a corresponding timeline.

In graph 500, a discrete service may be queried by a parent node Si at a time 561. The discrete service may have a presence state transition delay 530 of about Td(Si, ti) for the discrete service to transition to a ready state. Since the discrete service may not need to be invoked, the parent node Si may send a subscription request message s to sub-tree Sj at the same time (e.g., at time 561). Alternatively, the parent node Si may send a subscription request message s to sub-tree Sj at some time after time 561. After some time (e.g., at time 562), the subscription request message s may be received at the sub-tree Sj. Since the sub-tree Sj may not need to be invoked first, the sub-tree Sj may send a subscription response message r back to the parent node Si upon receiving the subscription request message s (e.g., at time 562). The subscription response message r may indicate a presence state transition delay 540 of about Tc(Sj, tj) amount of time for a sub-tree Sj. The subscription response message r may have a communication delay of about Tm(r, Sj, Si) amount of time to travel from the sub-tree Sj to the parent node Si. A remaining time delay 550 until the sub-tree Sj to becomes ready at time 564 may be computed by subtracting the communication delay Tm(r, Sj, Si)) of the message from the presence state transition delay 540 (e.g., Tc(Sj, tj)) of the sub-tree Sj. Generally, the presence delay of a sub-tree Sj may be computed by the parent node running the discrete service Si without invoking the service Sj using equation 1:

$$T_c(S_j,t_j)-T_m(r,S_j,S_i). \quad (1)$$

The presence state transition delay 540 of a sub-tree Sj may be computed based on the node type (e.g., AND node, OR node, or atomic node) of a node as different types of nodes may have different dependencies on their child nodes. In one embodiment, the presence state transition delay of an AND node may be computed by a node (e.g., a parent node or a child node) Si running the discrete service without invoking a sub-tree Sj using equation 2:

$$T_c(S_i,t_i)=T_d(S_i,t_i)+\max[z(T_c(S_j,t_j)-T_m(r,S_j,S_i))] \text{ for all } S_j \text{ in } C(S_i), \quad (2)$$

where $C(S_i)$ is a set of the child services of discrete service $S_i$, $z(x)$ is a function that maps a positive argument to itself (e.g., $z(x)=x$ when $x>0$, and a negative argument to zero (e.g., $z(x)=j$) otherwise, and $t_i$ is the delivery time of the subscription response message r at the sub-tree $S_j$. In one embodiment, the function $z(x)$ may be employed to avoid getting a negative communication delay, for example, from subtracting two timestamps. For an AND node to be present, all of the child nodes of the AND node are present. The presence state transition delay calculation for the child nodes of an AND node may be represented by the maximum function in equation 2. The presence state transition delay of an OR node may be computed by a node (e.g., a parent node or a child node) Si without invoking a sub-tree Sj using equation 3:

$$T_c(S_i,t_i)=T_d(S_i,t_i)+\min[z(T_c(S_j,t_j)-T_m(r,S_j,S_i))] \text{ for all } S_j \text{ in } C(S_i). \quad (3)$$

The OR node may be present when at least one of child node of the OR node is present. The presence state transition delay calculation for the child nodes of an OR node may be represented by the minimum function in equation 3. The presence state transition delay of an atomic node may be computed by a node (e.g., a parent node or a child node) Si using equation 4:

$$T_c(S_i,t_i)=T_d(S_i,t_i). \quad (4)$$

An atomic node may be independent and may not have any children. As such, the presence transition delay may be about the presence state transition delay of the discrete service Si.

Figure 6:
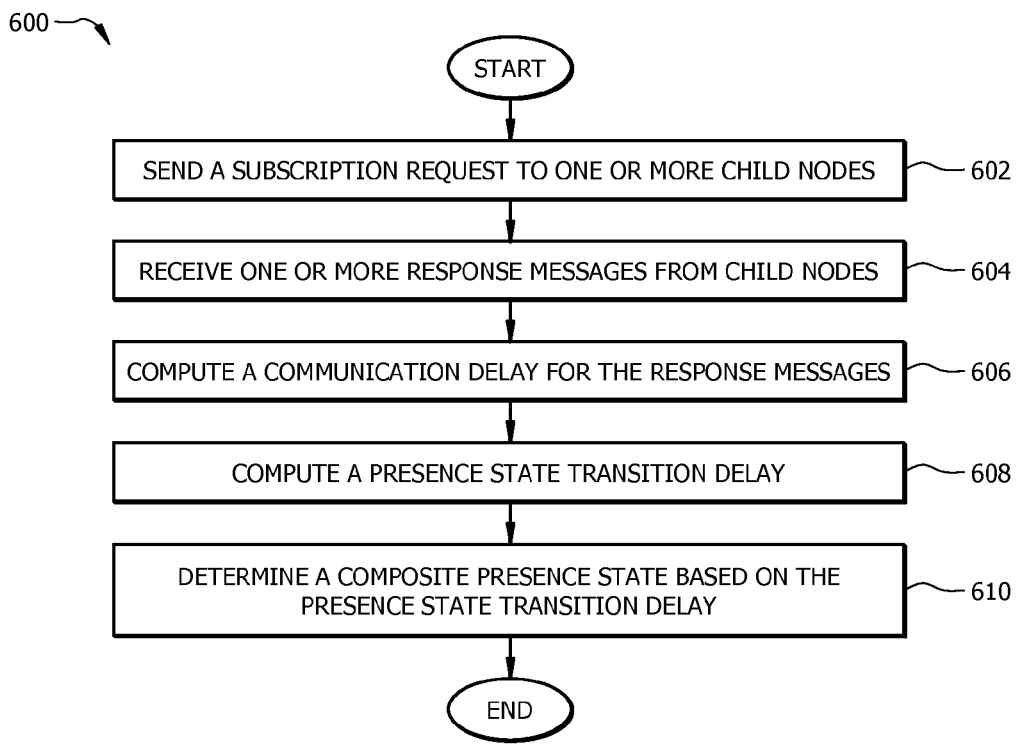
FIG. 6 is a flowchart of an embodiment of a presence subscription method.

FIG. 6 is a flowchart of an embodiment of a presence subscription method 600 for a TAO tree. In one embodiment, a method 600 may be implemented by a node Pi (e.g., a parent node) to subscribe to a presence state and/or to receive presence state transition delay information from a child node or a sub-tree. Presence state transition delays of nodes may be initialized during a presence subscription phase. In a presence subscription phase, a parent node may send (e.g., multicast) a presence subscription request to one or more child nodes. The presence subscription request may be sent using SIP, XMPP, or any other suitable protocol as would be appreciated by one of ordinary skill in the art upon viewing this disclosure. When a child node receives the presence state transition subscription request, the presentity at the child node may contact one or more of its child nodes or a sub-tree to compute and/or receive their presence state transition delays. Once the presence state transition delays are obtained, the presentity may compute a presence state transition delay for the composite service and may send the presence state transition delay of the composite service to the parent node in a subscription response message. For instance, the presence state transition delay may be computed using equations 1-4. The parent node may determine a presence state using an association between the presence state transition delay and a presence state.

At step 602, method 600 may send a presence subscription request (e.g., qj=Subscribe[ . . . ]) to one or more child nodes or a sub-tree. At step 604, method 600 may receive one or more response messages from child nodes. Method 600 may wait for and/or receive the subscription responses from the child nodes or sub-tree. A response message r from a sub-tree Pj may arrive at time t(Si, $r_j$). The response message r may be expressed using equation 5:

$$r_j=\text{Response}[\text{delay}=-T_c(P_j,t_j),\text{timestamp}=t(P_j,r_j)] \quad (5)$$

where $t(P_j, r_j)$ is the delivery time of the message $r_j$ at the sub-tree Pj. As shown in equation 6, the response may comprise the presence state transition delay, the presence state transition delay at sub-tree Pj, and/or the communication delay of the response message r. In one embodiment, the presentity of node Pi may use the presence state transition delay at sub-tree Pj and/or the communication delay to compute the presence state transition delay at sub-tree Pj. At step 606, method 600 may compute the communication delay $T_m(r, S_j, S_i)$ for each of the response messages $r_j$. The delivery time $t(P_j, r_j)$ of the message $r_j$ at the sub-tree Pj may be embedded in the response message $r_j$ and the response message $r_j$ arrival time $t(P_i, r_j)$ at the node Pi may be known to the node Pi. The communication delay may be computed using equation 6:

$$T_m(r_j,P_j,P_i)=t(P_i,r_j)-t(P_j,r_j). \quad (6)$$

At step 608, method 600 may compute the presence state transition delay for the node Pi according to equation 2 when the node Pi is an AND node or equation 3 when the node Pi is an OR node. At step 610, method 600 may determine a composite presence state based on the presence state transition delay. The presentity of node Pi may employ a presence state table (e.g., presence state table as described in FIG. 3) to determine a presence state for the composite service. The presentity may use an association or mapping between the computed presence state transition delay and a presence state to determine the composite presence state.

Figure 7:
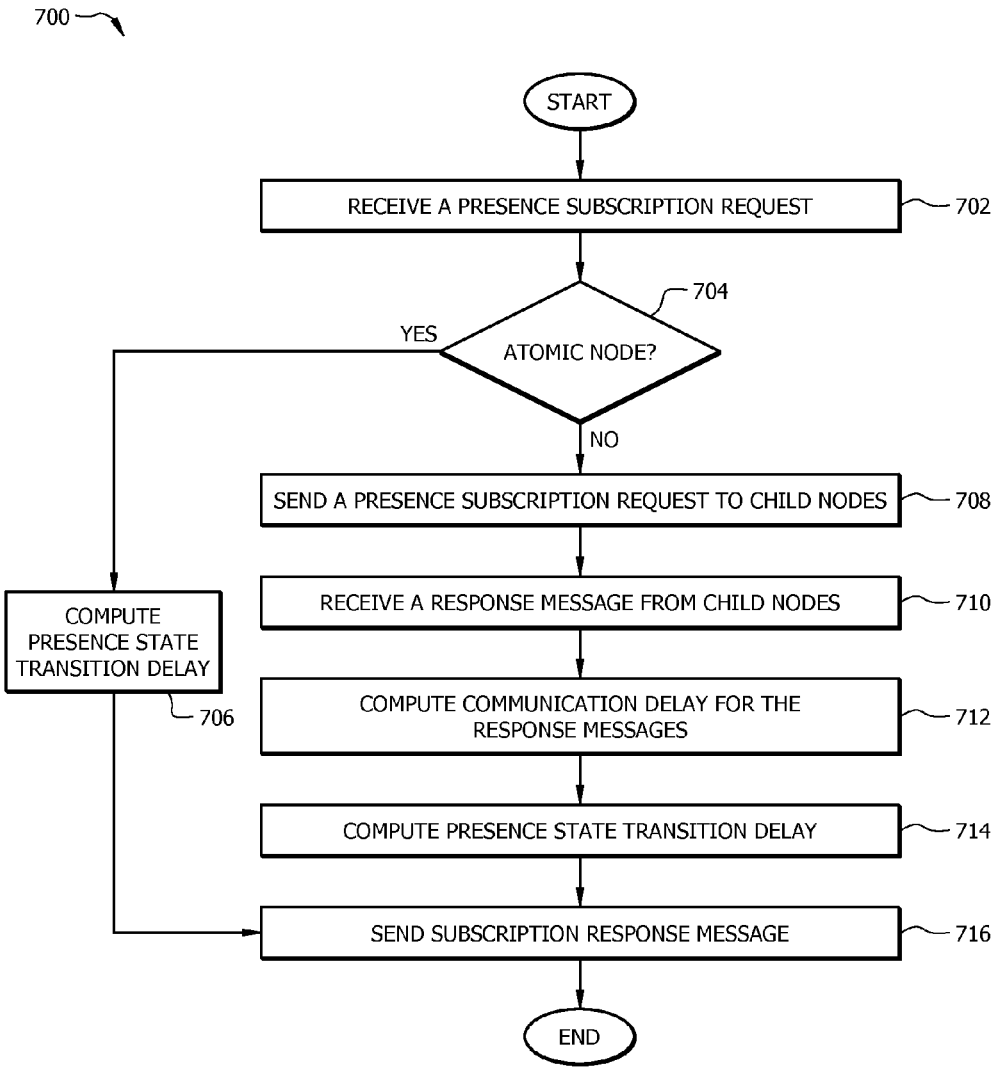
FIG. 7 is a flowchart of another embodiment of a presence subscription method.

FIG. 7 is a flowchart of another embodiment of a presence subscription method 700 for a TAO tree. In one embodiment, method 700 may be implemented by a node Pi (e.g., a child node) to respond to a presence subscription request for a composite service. At step 702, method 700 may receive a presence subscription request (e.g., qx=Subscribe[ . . . ]) from a node x. Method 700 may choose a scheduled delivery time t, to respond to the presence subscription request. At step 704, method 700 may determine if the node Pi is an atomic node or a composite node (e.g., an AND node or OR node). If node Pi is an atomic node, then method 700 may proceed to step 706, otherwise, method 700 may proceed to step 708. At step 706, method 700 may compute the presence state transition delay for the node Pi according to equation 4 as described in FIG. 5 and may proceed to step 716. At step 716, method 700 may send a subscription response to the node x. A subscription response $r_x$ to the node x may be expressed using equation 7:

$$r_x=\text{Response}[\text{delay}=T_c(P_i,t_i),\text{timestamp}=t_i]. \quad (7)$$

Returning to step 704, if node Pi is a composite node, method 700 may proceed to step 708. At step 708, method 700 may send a presence subscription request (e.g., qj=Subscribe[ . . . ]) to one or more child nodes or a sub-tree Pj. At step 710, method 700 may wait for and/or receive the subscription responses from the child nodes or sub-tree Pj. A response message r from a sub-tree Pj may arrive at time t(Si, $r_1$). The response message r may be expressed using equation 5 described in FIG. 6. As shown in equation 5, the response may comprise the presence state transition delay at sub-tree Pj and/or the communication delay of the response message r. In one embodiment, the presentity of node Pi may use the presence state transition delay at sub-tree Pj and/or the communication delay to compute the expected presence state transition delay at sub-tree Pj.

At step 712, method 700 may compute the communication delay $T_m(r, S_j, S_i)$ for each of the response messages $r_j$. The delivery time $t(P_j, r_j)$ of the message $r_j$ at the sub-tree Pj may be embedded in the response message $r_j$ and the response message $r_j$ arrival time $t(P_i, r_j)$ at the node Pi may be known to the node Pi. The communication delay may be computed using the equation 6 described in FIG. 6. At step 714, method 700 may compute the presence state transition delay for the node Pi according to equation 2 when the node Pi is an AND node or equation 3 when the node Pi is an OR node. At step 716, method 700 may send a subscription response to the node x as previously discussed. Method 700 may be recursive and/or executed one or more times in a TAO tree. For instance, method 700 may be performed at one or more nodes that may have one or more child nodes.

Figure 8:
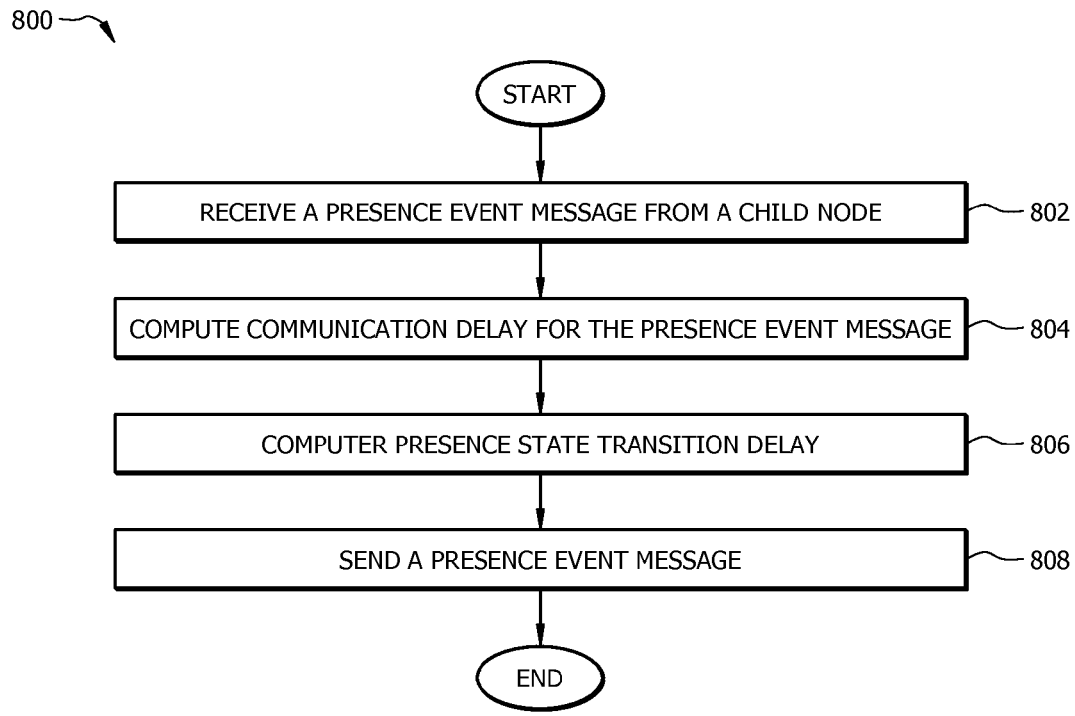
FIG. 8 is a flowchart of an embodiment of a presence event method.

FIG. 8 is a flowchart of an embodiment of a presence event method 800. In one embodiment, method 800 may be implemented by a node Pi (e.g., a child node) to update a presence state and/or a presence state transition delay for a composite service. When a discrete service changes its presence state, a presence event may be detected by its presentity. A presence event message may be used to update the presence delay. The presentity may send the presence event message to its parent node who subscribed to its presence. The parent node may receive the presence event message which may comprise the most recent presence delay, the presentity at the parent node may update its presence state transition delay. When the parent node is also a child node, the parent node may send the updated presence state transition delay to its parent node. A protocol extension may be configured to comprise one or more presence delays and/or timestamps.

At step 802, method 800 may receive a presence event message $e_j$ from a child node $P_j$ at a time $t(P_j, e_j)$. The presence event message may comprise a presence state transition delay $T_c(P_j, t_j)$ of the child node. A presence event message $e_j$ may be expressed using equation 8:

$$e_j=\text{Event}[\text{delay}=-T_c(P_j,t_j),\text{timestamp}=-t(P_j,e_j)], \quad (8)$$

where $t(P_j, e_j)$ is the delivery time of the event $e_j$ at the child node Pj. A presence event message $e_j$ may be received in response to, but not limited to, the addition and/or removal of one or more child nodes and the updating of a presence state for one or more child nodes. For example, a presence state message $e_j$ may be received in response to presence state of a child node Pj transitioning from unavailable to available. At step 804, method 800 may compute a communication delay for the presence event message $e_j$. The communication delay $T_m(e_j, P_j, P_i)$ for the presence event message $e_j$ may be computed similar to as describe in step 606 in FIG. 6. Accordingly, the communication delay for the presence event message $e_j$ may be expressed using equation 9:

$$T_m(e_j,P_j,P_i)=t(P_i,e_j)-t(P_j,e_j). \quad (9)$$

At step 806, method 800 may compute the presence state transition delay for the node Pi. The presence state transition delay $T_c(P_i,t_i)$ for the node Pi may be computed according to equation 2 when the node Pi is an AND node or equation 3 when the node Pi is an OR node. At step 808, method 800 may send the presence event message $e_i$ to its parent node. In one embodiment, the presence event message $e_i$ may be expressed using equation 10:

$$e_i=\text{Event}[\text{delay}=-T_c(P_i,t_i),\text{timestamp}=-t_i]. \quad (10)$$

Figure 9:
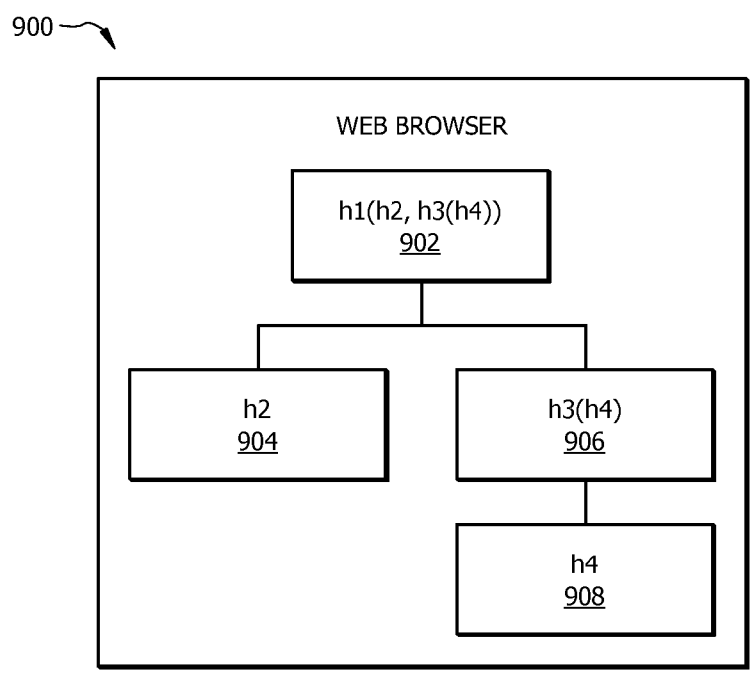
FIG. 9 is a diagram of an embodiment of a hyperlink pipelines system configured to employ a TAO tree.

FIG. 9 is an embodiment of a hyperlink pipeline system 900 configured to employ a TAO tree. In one embodiment, a hyperlink pipeline system 900 employing a TAO tree may be implemented in a client node (e.g., using javascript and a web browser) to combine a plurality of web resources. Additional details for a hyperlink pipeline system 900 may be as described in U.S. patent application Ser. No. 13/793, 066 entitled "Mechanisms to Compose, Execute, Save, and Retrieve Hyperlink Pipelines in Web Browsers," by Li Li, et al., which is hereby incorporated by reference as if reproduced in its entirety. For instance, the hyperlink pipeline system 900 may employ the TAO tree to combine a plurality of hyperlinks (e.g., h1-h4) 902-908. The TAO tree may be configured to compute a composite presence delay and/or a composite presence state for the hyperlink pipeline system 900. In one embodiment, a plurality of hyperlink pipelines may form a TAO tree comprising AND nodes and each destination hyperlink may represent a discrete service or a composite service in that node. For instance, hyperlink 902 may be configured as a composite service for a root node. The hyperlink pipeline system 900 may be configured to employ a presence subscription method (e.g., method 600 as described in FIG. 6 and/or method 700 as described in FIG. 7) and/or a presence event method (e.g., method 800 as described in FIG. 8) to compute one or more presence delays and/or may assign presence states based on the presence delays of individual hyperlinks.

Table 2 is an embodiment of presence delay calculations for the hyperlink pipeline system 900. Note that the communication delays for the hyperlink pipeline system 900 are not shown in Table 2. The presence state transition delay for hyperlink 902 may be about five seconds. Hyperlink 904 may be an atomic node and the sub-tree presence state transition delay may be about equal to the presence state transition delay, which may be about two seconds. The presence state transition delay for hyperlink 906 may be about seven seconds. Hyperlink 908 may be an atomic node and the presence state transition delay of the sub-tree may be about equal to the presence state transition delay, which may be about six seconds. The presence state transition delay for hyperlink 906 may be about equal to the sum of the presence state transition delay of hyperlink 906 and the presence state transition delay of hyperlink 908, which may be about 13 seconds. The presence state transition delay for hyperlink 902 may be about equal to the sum of the presence state transition delay of hyperlink 902 and the longest delay between the presence state transition delay of hyperlink 904 and the presence state transition delay of hyperlink 906, which may be about 18 seconds.

TABLE 2

Figure 10:
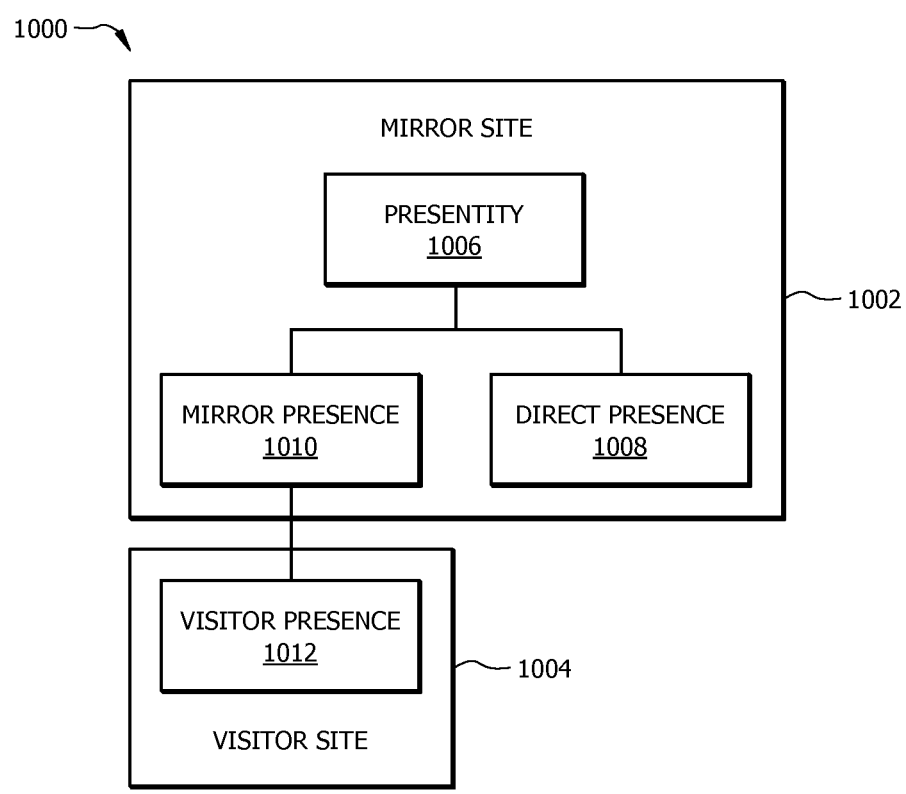
FIG. 10 is a diagram of an embodiment of a minor presence system configured to employ a TAO tree.

An embodiment of presence dalay calculations $Td(h1, t1) = 5$
$Tc(h2, t2) = Td(h2, t2) = 2$
$Td(h3, t3) = 7$
$Tc(h4, t4) = Td(h4, t4) = 6$
$Tc(h3(h4), t3) = Td(h3, t3) + Tc(h4, t4) = 7 + 6 = 13$
$Tc(h1(h2, h3(h4)), t1) = Td(h1, t1) + \max\{Tc(h2, t2), Tc(h3(h4), t3)\}$
$= \max\{Td(h2, t2), Td(h1, t1) + Tc(h3(h4), t3)\}$
$= \max\{2, 5 + 13\} = 18$ FIG. 10 is an embodiment of a mirror presence system 1000 configured to employ a TAO tree. A mirror presence system 1000 may comprise a distributed system configured to locate a user on the web based on their presence. Additional information for a mirror presence system 1000 may be described in U.S. patent application Ser. No. 13/962, 733, entitled "Mirror Presence Between Websites," by Li Li, et al., which is hereby incorporated by reference as if reproduced in its entirety. In one embodiment, a mirror presence system 1000 may be configured to implement a TAO tree to compute presence delays and/or a composite presence state based on the presence states of a plurality of websites. The mirror presence system 1000 may comprise a minor site 1002 and a visitor site 1004. The mirror site 1002 may comprise a presentity 1006, a direct presence 1008, and a minor presence 1010. The visitor site 1004 may comprise a visitor presence 1012. In one embodiment, the presentity 1006 may be an OR node with two children (e.g., the direct presentity 1008 and the mirror presence 1010). The minor site 1002 may be configured to subscribe to one or more presence states from the visitor site 1004. The visitor site 1004 may be configured to send presence event messages to the mirror site 1002. The mirror site 1002 may be configured to employ a presence subscription method (e.g., method 600 as described in FIG. 6 and/or method 700 as described in FIG. 7) and/or a presence event method (e.g., method 800 as described in FIG. 8) to calculate a presence delay and/or a composite presence state from the direct presence 1008 and the minor presence 1010.

Figure 11:
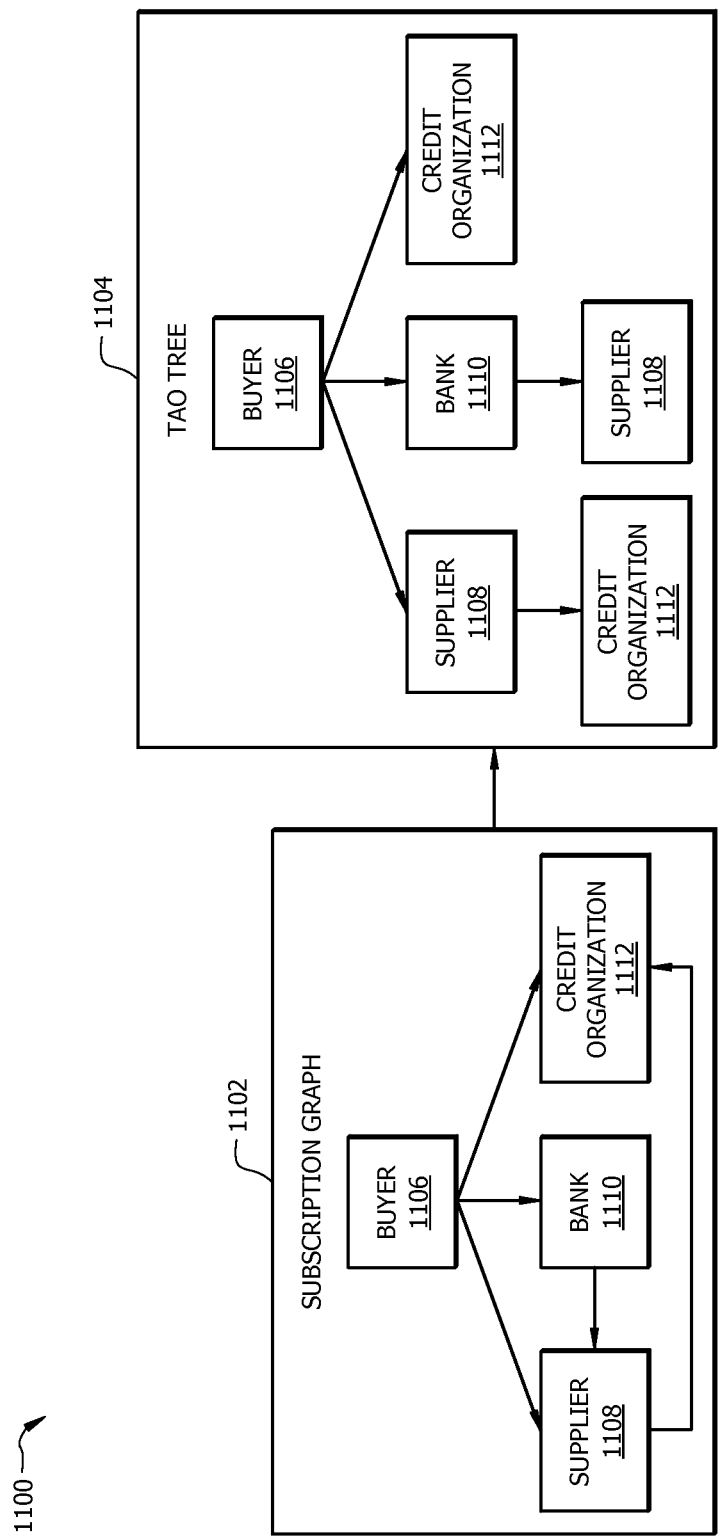
FIG. 11 is a diagram of an embodiment of a WS-BPEL workflow.

FIG. 11 is an embodiment of a WS-BPEL workflow 1100. A TAO tree 1104 may be overlaid on top of a WS-BPEL workflow 1100 through one or more presence subscriptions between a WS-BPEL engine and one or more partner services. A subscription graph 1102 may be derived from a WS-BPEL system and/or may describe a relationship between a plurality of resources. For example, the subscription graph 1102 may be configured to describe a workflow between a buyer 1106, a supplier 1108, a bank 1110, and a credit organization 1112. The TAO tree 1104 may be used to represent the subscription graph 1102 as a tree structure. The TAO tree 1104 may be configured to employ a presence subscription method (e.g., method 600 as described in FIG. 6 and/or method 700 as described in FIG. 7) and/or a presence event method (e.g., method 800 as described in FIG. 8) to allow an WS-BPEL engine to receive presence event messages and calculate a presence delay and/or a composite presence state for the composed service.

Figure 12:
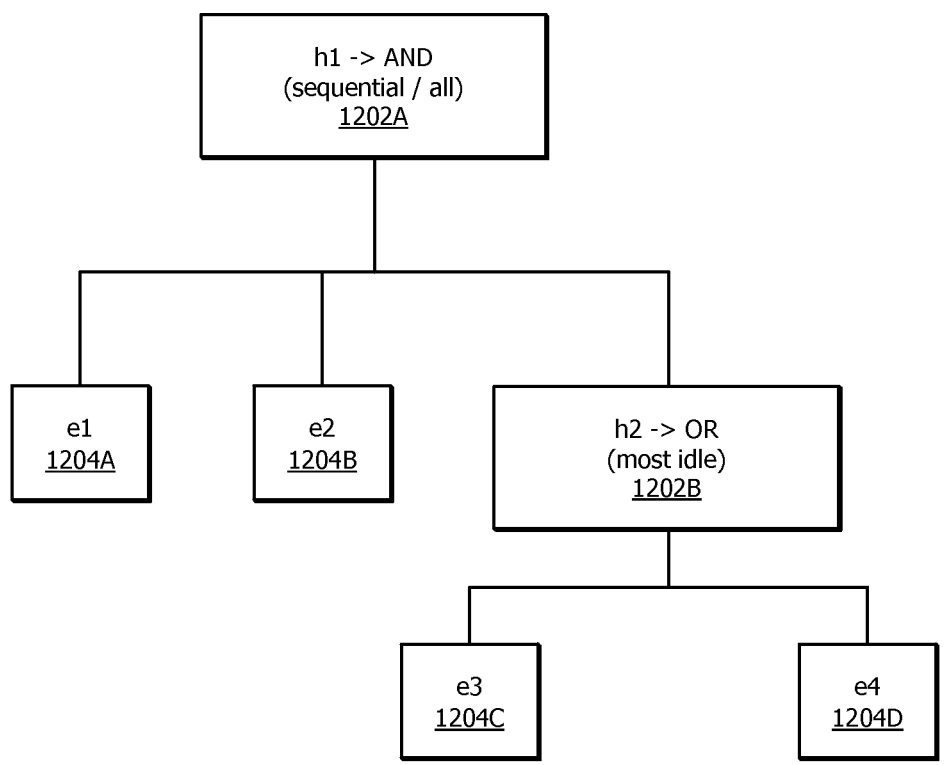
FIG. 12 is a diagram of an embodiment of a hierarchical hunt group system configured to employ TAO tree.

FIG. 12 is an embodiment of a hierarchical hunt group system 1200 configured to employ a TAO tree. The hierarchical hunt group may comprise a plurality of hunt groups 1202A and 1202B and a plurality of end points 1204A-1204D. A hunt group 1202A and 1202B may be configured as either an AND node or an OR node as described in FIG. 3 according to the mode of the hunt group. Each endpoint 1204A-1204D may be configured as an atomic node. The hunt groups 1202A and 1202B may be configured to employ a presence subscription method (e.g., method 600 as described in FIG. 6 and/or method 700 as described in FIG. 7) and/or a presence event method (e.g., method 800 as described in FIG. 8) to subscribe to the presence of its member nodes, receive presence events from its members, calculate a composite presence delay and/or a composite presence state, and send group presence event message to a parent node.

In one embodiment, a hyperlink pipeline may implement a TAO tree to compose a pipeline presence for Web Real-Time Communications (WebRTC) applications. A round-trip subscription delay between a first user's browser to another user's browser was measured. Table 3 is an embodiment of the measured round-trip subscription delays averaged over 20 runs.

TABLE 3

| An embodiment of round-trip subscription delays | | |
| --- | --- | --- |
| Performance | Mean (ms) | Std |
| Subscription | 11.55 | 1.73 |
| Event | 12.3 | 2.83 |
| Composition | 1.25 | 0.44 |

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, e.g., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. In a node, a presence calculation method comprising:
   receiving a first presence subscription request for a composite service that comprises a service at the node and a plurality of discrete services at one or more child nodes;
   sending a second presence subscription request to the one or more child nodes in response to the first subscription request;
   receiving one or more response messages that comprise a collection of presence state transition delays corresponding to the child nodes from the child nodes in response to the second subscription request;
   determining one or more communication delays between the node and the child nodes using the response messages;
   computing a presence state transition delay for the composite service using the collection of presence state transition delays and the communication delays; and
   determining a composite presence state using a mapping between the presence state transition delay for the composite service and the composite presence state,
   wherein the presence state transition delay for the composite service indicates an amount of time for the node to transition to an available presence state from another presence state.

2. The method of claim 1, wherein determining the composite presence state is performed using a look-up table that comprises a mapping between one or more presence state transition delays and one or more composite presence states.

3. The method of claim 1, wherein computing the presence state transition delay is performed without invoking one or more discrete services.

4. The method of claim 1, wherein the node is configured to transition to an available presence state in response to the child nodes transitioning to an available presence state, and wherein computing the presence state transition delay comprises:
   computing an expected presence state transition delay for the child nodes; and
   finding a maximum expected presence state transition delay for the child nodes.

5. The method of claim 4, wherein computing the expected presence state transition delay comprises subtracting the communication delay from the presence state transition delay for the child nodes.

6. The method of claim 1, wherein the node is configured to transition to an available presence state in response to one or more of the child nodes transitioning to an available presence state, and wherein computing the presence state transition delay comprises:
   computing an expected presence state transition delay by subtracting the communication delay from the presence state transition delay for the child nodes; and
   finding a minimum expected presence state transition delay for the child nodes.

7. The method of claim 1, wherein computing the presence state transition delay comprises subtracting the communication delay from the presence state transition delay for the child nodes.

8. The method of claim 1, wherein the presence state transition delay for the composite service indicates a unit of time to transition to an available presence state, and wherein the composite service is configured to interact with one or more network resources in the available presence state.

9. The method of claim 1, wherein the communication delay indicates a unit of time to receive the response messages from the child nodes.

10. The method of claim 1, wherein determining the communication delay for the response messages comprises using one or more time stamps.

11. An apparatus for monitoring a presence state of a service comprising:
a memory;
a processor coupled to the memory, wherein the memory comprises computer executable instructions stored on a non-transitory computer readable medium such that when executed by the processor causes the processor to:
receive a subscription request for a composite service that comprises one or more discrete services;
send a subscription request to one or more child nodes in response to receiving the subscription request;
receive one or more subscription response messages from the child nodes that comprise a collection of presence state transition delays of the child nodes;
compute a presence state transition delay based on the collection of presence transition delays of the child nodes and a communication delay for the subscription response message; and
send a second subscription response message that comprises the presence state transition delay of the processor,
wherein the presence state transition delay of the processor indicates an amount of time for the processor to transition to an available presence state from another presence state.

12. The apparatus of claim 11, wherein computing the presence state transition delay is performed without invoking one or more discrete services.

13. The apparatus of claim 11, wherein an expected presence state transition delay for the apparatus is equal to the presence state transition delay when the node has no child nodes.

14. The apparatus of claim 11, wherein the network device configured to transition to an available presence state in response to the child nodes transitioning to an available presence state, and wherein the computer executable instructions, when executed by the processor, cause the network device to:
compute an expected presence state transition delay by subtracting the communication delay from the presence state transition delay for the child nodes;
determine a maximum expected presence state transition delay for the child nodes; and
add the maximum presence state transition delay to the presence state transition delay for the network device.

15. The apparatus of claim 11, wherein the network device is configured to transition to an available presence state in response to one or more of the child nodes transitioning to an available presence state, and wherein the computer executable instructions, when executed by the processor, cause the network device to:
compute an expected presence state transition delay by subtracting the communication delay from the presence state transition delay for the child nodes;
determine a minimum expected presence state transition delay for the child nodes; and
add the minimum presence state transition delay to the presence state transition delay for the network device.

16. An apparatus comprising: a receiver configured to receive a presence event message from a sub-tree, wherein the presence event message comprises a presence state transition delay for the sub-tree; a processor couple to a memory device and the receiver, wherein the memory comprises computer executable instructions stored in a non-transitory computer readable medium such that when executed by the processor causes the processor to compute a presence state transition delay for the apparatus using the presence state transition delay for the sub-tree; and a transmitter coupled to the processor, wherein the transmitter is configured to send a presence event message that comprises the presence state transition delay for the apparatus to a parent node, wherein an expected presence state transition delay for longer has child nodes.

17. The apparatus of claim 16, wherein the computer executable instructions, when executed by the processor, cause the processor to compute a communication delay for the presence event message, and wherein computing the presence state transition delay comprises subtracting the communication delay from the presence state transition delay for the sub-tree.

18. The apparatus of claim 17, wherein the apparatus is configured to transition to an available presence state in response to the child nodes transitioning to an available presence state, and wherein the computer executable instructions, when executed by the processor, cause the processor to:
determine a maximum presence state transition delay for the sub-tree; and
add the maximum presence state transition delay to the presence state transition delay for the apparatus.

19. The apparatus of claim 17, wherein the apparatus is configured to transition to an available presence state in response to one or more of the child nodes transitioning to an available presence state, and wherein the computer executable instructions, when executed by the processor, cause the processor to:
determine a minimum presence state transition delay for the sub-tree; and
add the minimum presence state transition delay to the presence state transition delay for the apparatus.

* * * * *

UNITED STATES PATENT AND TRADEMARK OFFICE
CERTIFICATE OF CORRECTION

PATENT NO. : 9,509,572 B2
APPLICATION NO. : 14/317050
DATED : November 29, 2016
INVENTOR(S) : Li Li et al.

Page 1 of 1

It is certified that error appears in the above-identified patent and that said Letters Patent is hereby corrected as shown below:

In the Claims

Column 20, Lines 17-31, Claim 16, should read:
An apparatus comprising:
    a receiver configured to receive a presence event message from a sub-tree, wherein the presence event message comprises a presence state transition delay for the sub-tree;
    a processor couple to a memory device and the receiver, wherein the memory comprises computer executable instructions stored in a non-transitory computer readable medium such that when executed by the processor causes the processor to compute a presence state transition delay for the apparatus using the presence state transition delay for the sub-tree; and
    a transmitter coupled to the processor, wherein the transmitter is configured to send a presence event message that comprises the presence state transition delay for the apparatus to a parent node,
    wherein an expected presence state transition delay for the apparatus is equal to the presence state transition delay when the apparatus no longer has child nodes.

Signed and Sealed this
Twenty-eighth Day of February, 2017

Michelle K. Lee
*Director of the United States Patent and Trademark Office*